Figure 1:
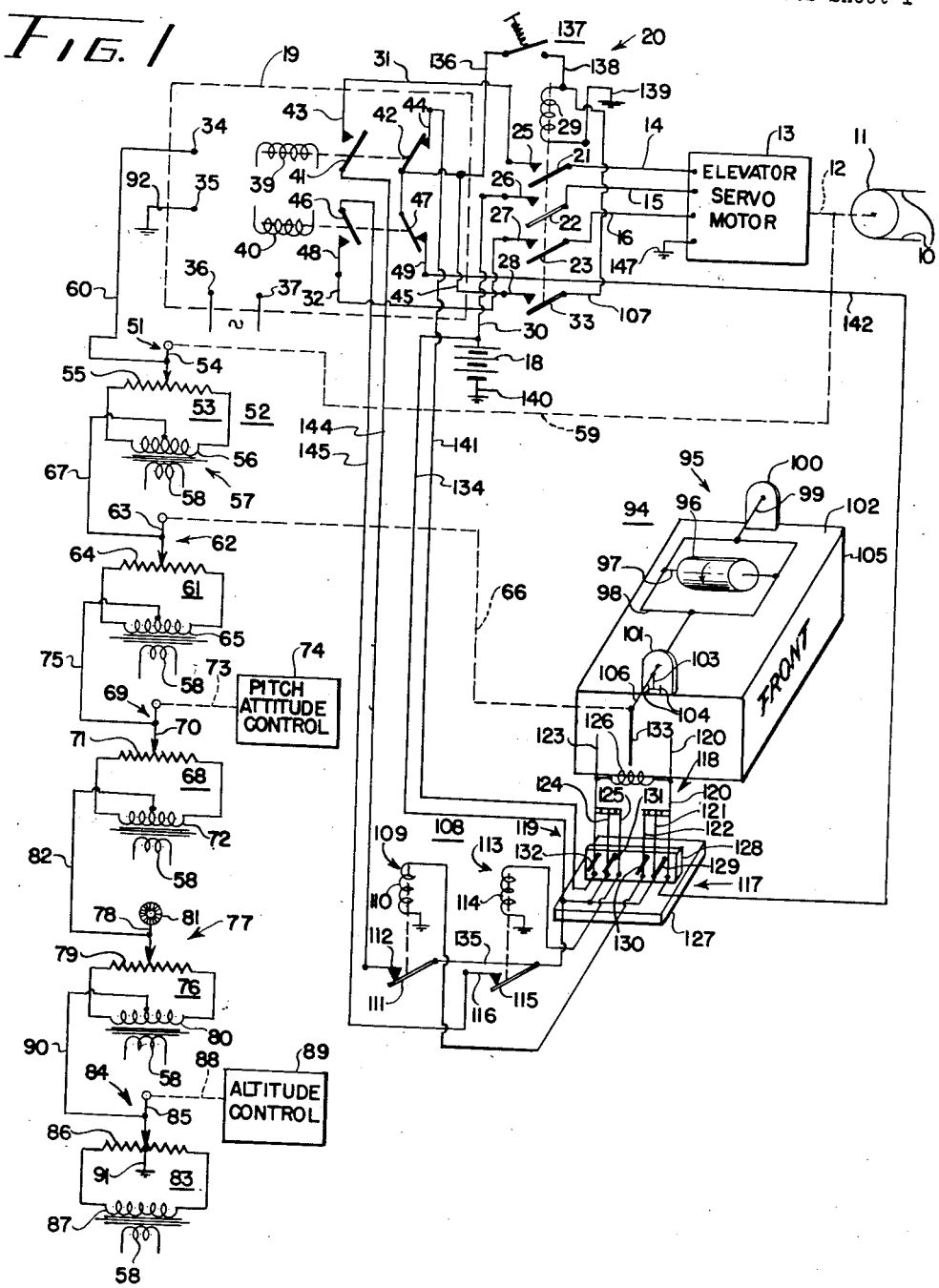

Oct. 23, 1956  R. J. KUTZLER  2,768,343
ANGULAR VELOCITY CONTROL DEVICE FOR AIRCRAFT
Filed Sept. 12, 1952  2 Sheets-Sheet 1

INVENTOR.
ROBERT J. KUTZLER
BY
George H. Fisher
ATTORNEY

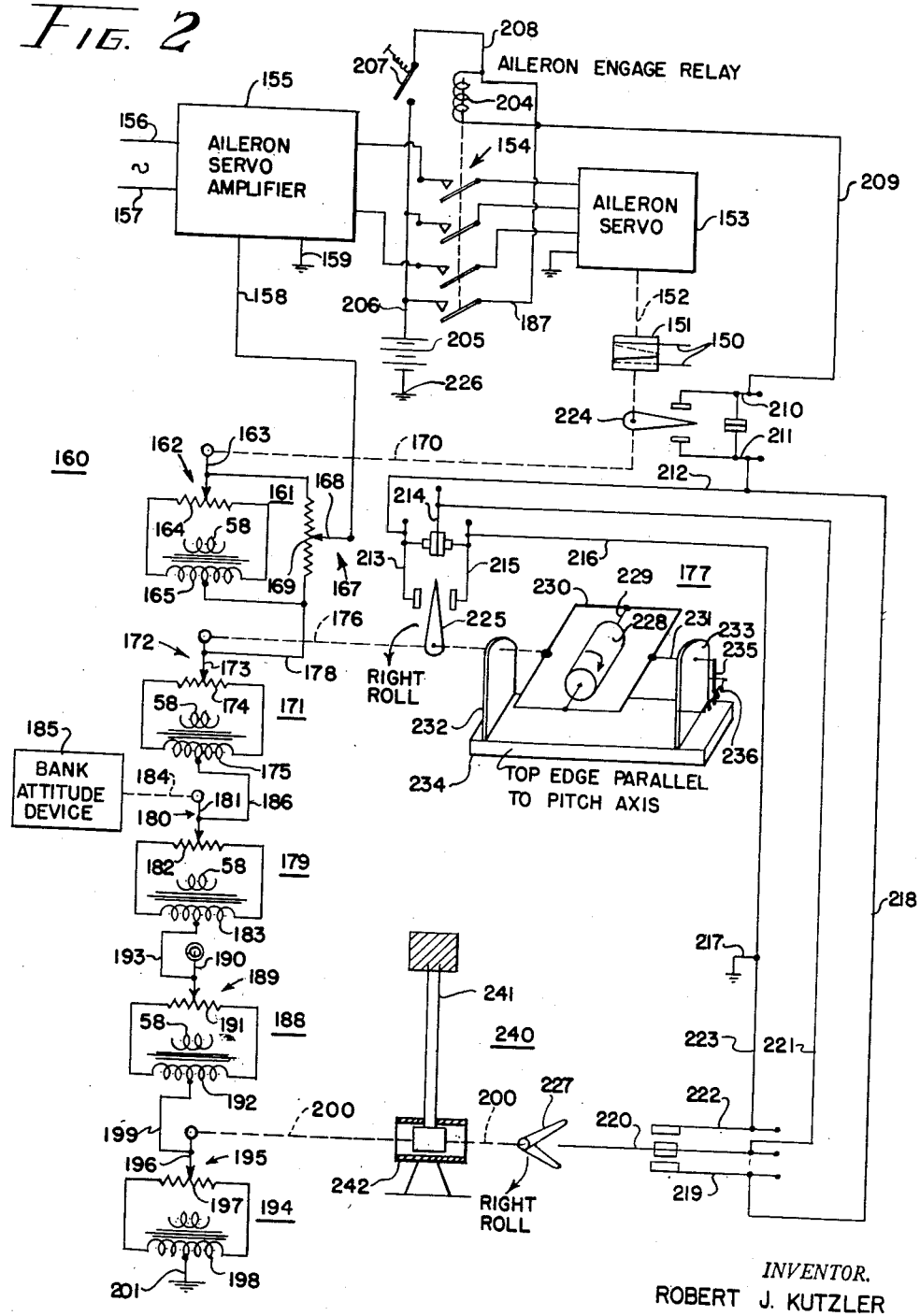

United States Patent Office 2,768,343
Patented Oct. 23, 1956

2,768,343
ANGULAR VELOCITY CONTROL DEVICE FOR AIRCRAFT

Robert J. Kutzler, St. Louis Park, Minn., assignor to Minneapolis-Honeywell Regulator Company, Minneapolis, Minn., a corporation of Delaware Application September 12, 1952, Serial No. 309,295

21 Claims. (Cl. 318—489)

This invention pertains to monitoring or safety devices for monitoring the angular movements of dirigible craft such as aircraft. The invention is herein shown as applied to an automatic pilot for an aircraft which operates, by way of example, the elevator control surface of such craft to control the angular movements of the craft about its pitch axis.

Such craft is subject to external transient disturbances such as upward or downward air currents that give the craft not only a vertical translational movement but also an angular movement about its pitch axis. The automatic pilot for the aircraft may oppose the translational movement by a constant altitude control and the angular movement by an attitude control. Either form of control results in operation of the elevator surface which ultimately stops further change in altitude or attitude and further effects a movement of recovery or restoration to the original altitude or attitude.

The automatic pilot may also include selective means for changing the altitude or attitude of the craft by operating the elevator control surface. Such operation of the elevator surface effects a rotation thereof about the pitch axis and results in changes in craft attitude to regain the original altitude. The rotation may also be selectively stopped when the attitude is such as to give a desired rate of change of altitude or the attitude attained is the new attitude desired.

The monitoring control of the present invention primarily provides a safety feature that is adapted to modify the operation of the input means of the automatic pilot so that it may be rendered ineffective in the operation of the elevator control surface should it have a tendency to continue to operate such surface in an incorrect direction.

This invention monitors the angular movements of the craft during the recovery or restoration movement of the craft when for example an external transient disturbance has been applied thereto and also during the attitude change when the selective attitude or altitude changes are applied.

The automatic pilot includes a servomotor that may be operatively engaged with the elevator control surface of an aircraft to operate the same. The automatic pilot includes input control means responsive to detecting means which sense changes of the aircraft from a desired condition for controlling the servomotor to restore the condition. The input means is also responsive to selective means for effecting desired changes in the condition by additional operation of the servomotor.

A responsive device providing an output proportional to the rate of angular rotation of the craft during restoration of the condition on the one hand or the angular rate of rotation of the aircraft during selected changes in the condition operates through a modifying means to modify the action of the input means of the servomotor that may render the same ineffective when a predetermined rate of angular movement of the craft is attained. The modifying means compares the controls to be applied by the input means and by the angular rate responsive device as to phase and amplitude and provides an effect when the phases are the same and the rate of turn of the craft reaches a predetermined magnitude which prevents said input means from causing further operation of the elevator control surface in a direction to increase the rate of angular rotation of the craft but permits said input means to cause reverse operation of the elevator surface tending to decrease said angular rate of rotation of the craft.

The modifying means during the comparison of the two controls from the input means and from the angular rate responsive device as to phase and magnitude also functions additionally when they are of the same phase and a maximum angular rate of the craft is exceeded to operatively disengage said servomotor from the elevator control surface. When thus disengaged from its servomotor, the elevator control surface may be directly manually operated.

The above features and structural arrangement of the invention will be apparent from the following description when read in comparison with the annexed drawing, wherein:

Figure 1 is a schematic arrangement of one form of monitoring device associated with an automatic pilot for controlling the craft about its pitch axis, and Figure 2 is a schematic arrangement of a modification of the structure of Figure 1 and adapted to control the craft about its longitudinal axis.

Referring to Figure 1, an aircraft in which the arrangement may be installed includes an elevator control surface (not shown) which may be conventionally directly manually actuated. This elevator control surface may be also power operated from one channel of an automatic pilot by means of cables 10 extending therefrom to a cable drum 11 which is carried on an output shaft 12 of an elevator servomotor 13. The servomotor is of the reversible direct current energized type. The servomotor as known in the art is provided with input connections 14, 15, and 16. The input connection 15 serves to operatively engage the servomotor 13 with its cable drum 11 and thus operatively engages the servomotor 13 with the elevator control surface. The input connection 14 controls rotation of the servomotor 13 in one direction whereas the input connection 16 controls the opposite rotation of the servomotor.

The servomotor input connections 14, 15, and 16 are electrically connected to a source of direct current such as a battery 18 and an amplifier 19, constituting part of an input control means, through an elevator engage relay 20. To this end, conductors 14, 15, and 16 extend between the servomotor 13 and arms 21, 22, and 23 of the relay 20. These relay arms may be brought into contact respectively with in contacts 25, 26, and 27. Extending from the middle contact 26 is a conductor 30 connected to battery 18 so that relay arm 22 and its contact 26 effect the engagement of the servomotor 13 with the elevator control surface. Conductors 31 and 32 extend from the relay in contacts 25 and 27 to the amplifier 19 of known type.

The amplifier 19 includes A. C. control signal input terminals 34, 35, and A. C. power input terminals 36, 37. Within amplifier 19 are operating windings 39 and 40 for two relays. One or the other of the operating windings is energized depending upon the phase relationship of the voltage across amplifier signal input terminals 34, 35 with respect to the voltage across the power input terminals 36, 37. Winding 39 operates relay arms 41, 42 which respectively coact with an in contact 43 and an out contact 44. Winding 40 operates relay arms 46, 47 which engage respectively in contact 48 and out contact 49. Conductor 31 extends from engage relay contact 25 to amplifier in contact 43 and conductor 32 extends from engage relay contact 27 to amplifier in contact 48. The relay arms 41 and 46 reversibly control the rotation of servomotor 13 and the amplifier relay arms 42 and 47 as will be more apparent hereinafter control the energization of the operating winding 29 of engage relay 20. The amplifier relay arms 41, 42, 46, and 47 are associated with modifying means to be described. Except for the particular function of the amplifier relay contacts, the amplifier-servomotor combination may be such as disclosed in Patent 2,425,734 to Willis H. Gille et al. or as in Patent 2,466,702 to Handy.

Alternating voltage control signals which are applied across the amplifier input terminals 34, 35 are obtained from a circuit including a balanceable voltage network 52. Network 52 includes a plurality of series connected individual sources of control voltage signals whereby a resultant signal is derived. The individual sources of control voltage signals in network 52 comprise a rebalance signal source 53, a craft angular rate source 61, a craft pitch attitude source 68, a manual craft trim source 76, and an altitude control source 83. Source 53 comprises a rebalancing potentiometer 51 having a slider 54 and a resistor 55 which is connected across a secondary winding 56 of a transformer 57 having a primary winding 58. Slider 54 is positioned along resistor 55 by follow-up drive means 59 connected to the output shaft 12 of servomotor 13. A conductor 60 connects slider 54 with amplifier input terminal 34. Source 61 comprises an angular rate potentiometer 62 having a slider 63 and a resistor 64. Resistor 64 is connected across a secondary winding 65 of a transformer. Since a single primary winding of a transformer may be used to energize a plurality of secondary windings, a primary winding common to all of the several sources is indicated. Thus primary winding 58 energizes the secondary winding 65. Slider 63 is positioned along resistor 64 by an angular rate responsive device 94, to be described. A conductor 67 extends from slider 63 to a center tap of secondary winding 56. Source 68 comprises a pitch attitude potentiometer 69 having a slider 70 and a resistor 71. Resistor 71 is connected across a secondary winding 72 of the transformer. Slider 70 is positioned along resistor 71 by a suitable operating means 73 extending thereto from a pitch attitude sensing device 74. A conductor 75 extends from slider 70 to a center tap of secondary winding 65. Source 76 comprises a manual trim potentiometer 77 having a slider 78 and a resistor 79. The resistor 79 is connected across a secondary winding 80 of the transformer. A manually operable knob 81 serves to position slider 78 along resistor 79. A conductor 82 connects slider 78 with a center tap of secondary winding 72. Source 83 comprises an altitude control potentiometer 84 having a slider 85 and resistor 86. Resistor 86 is connected across a secondary winding 87 of the transformer. Slider 85 is positioned along resistor 86 in accordance with changes in altitude of the craft by a suitable operating means 88 extending thereto from an altitude sensing device 89. A conductor 90 connects slider 85 with a center tap of secondary winding 80. Resistor 86 has a center tap lead 91 extending to ground and thus through ground and an amplifier ground conductor 92 to input terminal 35 of amplifier 19 to complete the circuit.

The craft angular pitch rate sensing device 94 may be a conventional rate of turn gyroscope 95. Such gyroscope is the type whose rotor has two degrees of angular freedom, one about its spin axis and the other about an axis at right angles thereto. Rotation about the latter axis is due to precession of the gyroscope and is opposed by suitable restraining means so that the magnitude of precession is proportional to an angular rate. The gyroscope 95 includes a rotor 96 with a spin axis 97 which is rotatably carried in a gimbal ring 98. The gimbal 98 has an axis of rotation 99 at right angles to the spin axis 97. The axis 99 is carried in suitable pedestal bearings 100, 101 extending upwardly from a base 102. Depending from one end of the axis 99 is a spring 103 which coacts with stop means 104 supported on bearing 101 to constitute restraining means to limit the precession of the gyroscope about axis 99 and to restore the gimbal 98 supporting the spin axis 97 of the gyro rotor to its normal position upon cessation of the rate of turn of the craft about the pitch axis. The gyroscope 95 is so mounted in the craft that an edge 105 of base 102 is parallel with the pitch axis of the craft with the gyroscope headed toward the front of the craft as indicated. The axis 99 has an extension 106 adjacent the spring means 103 which operates the potentiometer slider 63 through the operating means 66.

The pitch attitude sensing device 74 may be a conventional flight gyroscope whose rotor is carried in a casing for rotation about a vertical spin axis with the casing in turn angularly rotatable about two respectively perpendicular horizontal axes. Upon tilt of the craft about the pitch axis, the slider 70 is moved relative to resistor 71 in accordance with the magnitude of the change in pitch attitude and in a direction depending upon the direction of change of pitch attitude.

The altitude control device 89 is old in the art and may be of the type wherein the slider 85 may be declutched from its operating means until the desired altitude is attained at which point the operative engagement of the slider 85 and altitude control device 89 may be effected. The type of altitude control in which the slider 85 may be maintained centered until the desired altitude is reached as represented by Patent 2,474,618 to Divoll and the type of altitude control wherein the slider 85 may be disconnected from the altitude responsive device is represented by Patent 2,415,429 to Kellogg II et al.

A modifying means 108 for controlling the effect of an unbalance in the input control circuit across the amplifier terminals 34, 35 comprise a pair of relays 109, 113. Relay 109 controls the effect of an unbalance of the control circuit tending to cause the upward movement of the elevator control surface, and relay 113 controls the effect of an unbalance of the control circuit tending to cause the downward movement of the elevator control surface. Relay 109 includes an operating winding 110 for an arm 111. Operating winding 110 serves to engage arm 111 with an in contact 112. Relay 113 includes an operating winding 114 which serves to engage relay arm 115 with an in contact 116. The energization of winding 110 is controlled by a switch means 118 and the energization of winding 114 is controlled by a switch means 119. The switch means 118 and 119 constitute part of an aircraft rate of turn responsive switching device 117.

Switch means 118 comprises three contact bearing arms 120, 121, and 122 pivoted on a base 127. Switch means 119 comprises three pivoted switch arms 123, 124, and 125 also pivotally carried on base 127. Arms 120 and 123 are designated the outer arms and are elongated so that their upper ends may be engaged by a depending arm 133 carried on the extension 106 of rate responsive device 94. Spring means 126 interconnect arms 120 and 123 to bias the same toward center position which is limited by stop means supported from base 127. Arms 120 and 123 each carry an inwardly facing switch contact which coacts with a corresponding contact on intermediate switch arms 121 and 124. The opposite sides of switch arms 121 and 124 each support a second contact which engage respectively corresponding contacts on inner switch arms 122 and 125. Spring arms 121, 122 and 124, 125 are biased in the outward direction or toward their respective elongated arms 120, 123. The base member 127 adjacent the pivoted switch arms supports a vertical stop bearing member 128 from the side of which outwardly projects stops 129, 130, 131, and 132. Stops 129 and 130 are respectively associated with switch arms 121 and 122 and are so arranged on their supporting means 128 that when the elongated arm 120 is moved outwardly and switch arms 121 and 122 follow the movement of switch arm 120, the inner switch arm 122 engages its stop 130 before the switch arm 121 engages its stop 129 so that contact is broken between switch arms 121 and 122 before it is broken between arms 120 and 121. Similarly stops 131 and 132 coact respectively with switch arms 125 and 124 so that when elongated arm 123 is moved outwardly by depending arm 133, arm 125 engages its stop 131 before arm 124 engages its stop 132 so that engagement is broken between arms 125 and 124 before it is broken between arms 124 and 123. A conductor 134 connects the battery 18 with both intermediate contact arms 121 and 124 of switch means 118 and 119. A branch conductor 135 extends from conductor 134 to the switch arms 111 and 115 of relays 109, 113.

Included in the modifying means 108 and with switch means 118, 119 controlling the disengagement of the servomotor and elevator are the amplifier relay operated arms 42 and 47 with their in contacts 44, 49. A conductor 136 extends from relay arms 42, 47 to the arm of a single pole single throw manually operable engage switch 137. A conductor 138 connects the switch contact with the engage relay operating winding 29 of engage relay 20. The opposite side of the relay winding is connected by a conductor 139 to ground which is common to the battery ground conductor 140. A conductor 141 connects amplifier relay contact 44 with elongated switch arm 123, and a conductor 142 connects amplifier relay contact 49 with elongated switch arm 120. Thus with either of the amplifier relays in their unoperated position and the elongated switch arms 120, 123 in their normal inward position, where they engage stops 129 and 132, the engage relay operating winding 29 is energized upon closing of the switch 137.

The amplifier relay arms 41 and 46 alternatively control the energization of a servomotor 13 to effect its rotation. A conductor 144 extends from amplifier relay arm 41 to relay in contact 112 and a conductor 145 connects amplifier relay arm 46 with relay in contact 116.

While the operation of the device may now be self-evident, a brief recital of its operation during one phase of its control will be given. It is assumed that the aircraft has been manually flown until the desired altitude and attitude has been attained. With the craft in the desired attitude preferably in level flight position, the pitch attitude sensing device 74 will have adjusted slider 70 to the midpoint of resistor 71.

The altitude control device 89 will have moved slider 85 to the center of resistor 86. With the altitude controller capable of operating its slider 85 and the craft in the desired attitude and altitude, the single pole engage switch 137 may be closed. Momentary closure of switch 137 biased to open position completes a circuit from battery 18, conductor 134, through parallel branches one comprising intermediate switch arm 121, elongated switch arm 120, conductor 142, amplifier relay out contact 49, relay arm 47, conductor 136, switch 137, conductor 138, relay operating winding 29, conductor 139, to ground and return to battery ground 140 the other comprising intermediate switch arm 124, elongated switch arm 123; conductor 141, amplifier relay out contact 44, relay arm 42, conductor 136, switch 137, conductor 138, operating winding 29, conductor 139, to ground and return to battery ground conductor 140. The relay winding 29 is maintained energized by a holding branch comprising conductor 136, conductor 45, in contact 28, relay arm 33, conductor 107, and conductor 138 after switch 137 opens or releases. With the engage relay operating winding 29 energized and relay arms 21, 22, and 23 in their upward position in the figure, a circuit for effecting the operative engagement of the servomotor 13 with the cable drum 11 is completed from battery 18, conductor 30, engage relay contact 26, relay arm 22, servomotor connection 15, servomotor 13, servomotor ground conductor 147, and return to battery ground conductor 140. The servomotor and elevator control surface are now operatively engaged.

With the craft in level attitude position and at the desired altitude, the network 52 may be assumed in a balanced condition with all of the sliders at the center of their respective resistors. If an upward current of air strikes the tail surfaces of the aircraft, the craft undergoes an upward translation and also a tilting about the pitch axis so that the craft points downwardly. Assuming that the change in altitude may be disregarded, because of its insignificant amount, the operation is considered with respect to the response of the pitch attitude sensing device 74. The pitch attitude device 74 in response to the downward attitude of the aircraft moves slider 70 with respect to resistor 71 to unbalance the network 52. The unbalance of network 52 is in such a direction as to call for an upward movement of the elevator control surface. In response to this unbalance signal, the amplifier 19 energizes the relay winding 39 whereby relay arms 41 and 42 are moved to their operated positions. The engagement of arm 41 with contact 43 completes a circuit for energizing the servomotor, the circuit comprising battery 18, conductor 134, branch conductor 135, relay arm 111, relay contact 112, conductor 144, relay arm 41, relay contact 43, conductor 31, engage relay contact 25, relay arm 21, conductor 14, servomotor 13, motor ground conductor 147, and return to battery ground conductor 140. The servomotor 13 moves the elevator control surface upwardly and through its follow-up connection 59 the servomotor 13 moves slider 54 relative to resistor 55 to develop a rebalancing voltage in source 53 which is opposite in phase to the attitude control voltage from source 68, and this rebalancing voltage increases until network 52 is in balanced condition.

The displaced elevator surface tends to check further change in attitude of the aircraft downwardly. Under the continued application of this up elevator, the aircraft changes its attitude upwardly toward its original position. This is the recovery or restoration angular rotation of the aircraft from maximum attitude departure of the craft about its pitch axis.

We assume that the depending arm 133 from the angular rate device 94 has been arranged so that it will engage the elongated switch arms 120, 123 when a predetermined angular pitch rate of the craft is exceeded. If the rate is in an upward direction due to the displaced elevator control surface and reaches the predetermined magnitude, the arm 133 engages elongated switch arm 120 and moves it outwardly a proportional extent, the intermediate switch arm 121 follows the movement of outer switch arm 120 but the inner switch arm 122 has its movement interrupted by its engagement with stop 130. The energizing circuit for operating winding 110 of relay 109 is interrupted due to separation of switch arms 122 and 121. Arm 111 is therefore disengaged from in contact 112. The separation of relay arm 111 and contact 112 prevents further energization of servomotor 13 through conductor 14 thereby further movement of the elevator in the upward direction is prevented. Since the rate of turn of the aircraft about the pitch axis upwardly has reached the predetermined value but not a maximum value, the engage relay winding 29 is maintained energized through the continued engagement of elongated switch arm 120 and switch arm 121 along with the engagement of the unoperated amplifier relay arm 47 which in this condition engages out contact 49.

Thus where the phase of the control signal across amplifier input terminals 34 and 35 causes an upward displacement of the elevator and causes in the case considered an upward angular velocity of the craft, the angular rate device 94, in response to such craft angular velocity has a response of such phase as to disengage switch contacts 121 and 122. With the control effect from network 52 of the same phase as the response of the angular rate device 94 and with the magnitude of the angular rate reaching a predetermined value, the servomotor 13 is rendered ineffective to further control the elevator surface tending to increase the angular rate of turn.

The operating winding 114 of the relay 113 associated with the downward movement of the elevator remains energized so that relay arm 115 continues to engage relay in contact 116. The circuit therefore is maintained to complete a circuit upon energization of amplifier relay winding 40 to effect downward movement of the elevator surface through servomotor 13. Such downward control may be obtained by manually moving the slider 78 of the source 76 in such a direction as to effect opposite unbalance of the network 52.

Should the upward rate of angular rotation of the craft during the previous phase under consideration exceed a maximum value the arm 133 due to further precession of the gyroscope 95 will additionally move switch arm 120 outwardly. Such movement may be such that the intermediate switch arm 121 has its movement interrupted by stop 129 so that switch arms 120 and 121 become disengaged. At this time both parallel paths which control the energization of engage relay operating winding 29 are broken, respectively between elongated switch arm 120 and middle switch arm 121 in the one case and the amplifier relay arm 42 and out contact 44 in the other case. With the engaged relay winding 29 deenergized, the relay arms 21, 22, 23, and 33 fall to the out position, and with the separation of arm 22 from its contact 26, the engaging circuit for the servomotor 13 is opened to operatively disassociate the servomotor 13 from the elevator control surface. The separation of relay arm 33 and contact 28 opens the holding circuit of the relay winding. At this time the elevator surface may be manually operated to reduce the angular velocity of the aircraft and keep it within safe limits.

It will be appreciated that if the aircraft had responded to a transient disturbance and assumed initially an upward attitude, that the elevator control surface would have been moved downwardly to restore the original attitude of the aircraft and that the craft angular rate responsive arrangement through the modifying means 108 would have compared the phase of the actual angular rate of the aircraft with the input control signal effect on amplifier 19 for operating the control surface, and if at that time the phases had been the same and if the predetermined angular rate had been exceeded the servomotor 13 would have been rendered ineffective to apply further down elevator displacement but that the elevator servomotor 13 could have applied up elevator to reduce the downward angular rate. Also if such downward angular rate had exceeded a maximum value that the elevator servomotor 13 would have been operatively disengaged from the elevator control surface and that manual operation of said surface would be permissible to reduce the downward angular rate of the craft to prevent injury thereto.

It will also be further evident that changes in attitude of the aircraft may be manually selectively introduced by adjusting the trim knob 81 to move slider 78 relative to resistor 79. Such movement of the slider relative to its resistor will develop a signal in source 76 to unbalance the network 52. This unbalance of network 52 is accompanied by a displacement of the elevator surface in a direction depending upon the adjustment of the slider 78 and this adjustment of the elevator is accompanied also by operation of the rebalance potentiometer slider 54 to rebalance network 52. During such selective change in attitude, the angular rate device 94 monitors the angular velocity of the aircraft to prevent such operation of the surface that will cause the craft to exceed a predetermined angular rate but permitting a reverse operation of the surface to reduce the angular rate.

It is known generally that the force on the wings of an aircraft during a turn in a vertical plane about an axis thereof is proportional to the centrifugal force. The centrifugal force is a function of the angular rate of the craft about a point in space. This angular rate is the same as the angular rate of the craft about its pitch axis. Thus by limiting the angular rate of the craft by a device responsive to the angular rate of the craft about its pitch axis in the above arrangement, the force on the wings and therefore on the structure of the aircraft is limited and injury to the structure of the craft is prevented.

It will therefore be appreciated that in the above apparatus in Figure 1 an arrangement has been provided which is responsive to the angular rate of an aircraft due to displacement of a control surface thereof by a servomotor, which displacement resulted from an external disturbance or when initiated from a selective manual controller, which imposes in the case of a predetermined angular rate, a limit on the displacement of such surface by said motor from which the angular rate is derived or in the case of a maximum angular rate, a disengagement of the servomotor from the displaced surface which caused said angular rate.

In Figure 2 there is illustrated a form of the invention applied to the aileron channel of an automatic pilot which controls an aircraft about its longitudinal or roll axis. Referring to Figure 2, the ailerons (not shown) of the aircraft are operatively connected to control cables 150 extending from a cable drum 151 carried by an output shaft 152 of an aileron servomotor 153. The aileron servomotor is reversibly controlled, through an aileron engage relay 154, by an aileron servomotor amplifier 155.

The aileron servomotor amplifier 155 includes power input conductors 156, 157 connected to the ship's supply of alternating voltage and signal input conductors 158, 159 connected to a balanceable alternating voltage network 160. The direction of rotation of the aileron servomotor 153 depends upon the phase relationship between the voltage across conductors 156, 157 with respect to the voltage across conductors 158, 159. The aileron amplifier has relays similar to the elevator servomotor amplifier 19 of Figure 1 with the exception that the relays in the aileron amplifier do not include the normally closed out contacts.

The balanceable network 160 comprises a follow-up rebalancing network 161, a roll rate network 171, a roll or bank attitude network 179, a roll attitude trim network 188, and a manually controlled maneuvering network 194. Network 161 comprises a follow-up potentiometer 162, a secondary winding 165 of the transformer, and a voltage dividing potentiometer 167. Potentiometer 162 comprises a slider 163 and a resistor 164 which is connected across the secondary winding 165. Potentiometer 167 comprises a manually adjustable tap 168 and a resistor 169 which is connected between slider 163 and a center tap of secondary winding 165. Slider 163 is positioned along resistor 164 through a suitable operating connection 170 extending from the aileron servomotor shaft 152. Amplifier conductor 158 extends to adjustable tap 168. Network 171 comprises a roll rate potentiometer 172 having a slider 173 and a resistor 174 which is connected across a secondary winding 175 of the transformer. Slider 173 is positioned along resistor 174 through a suitable operating means 176 by a roll rate gyroscope 177. A conductor 178 connects the center tap of secondary winding 165 and slider 173. Network 179 comprises a roll attitude potentiometer 180 having a slider 181 and a resistor 182 connected across a secondary winding 183 of the transformer. Slider 181 is positioned along resistor 182 through a suitable operating means 184 from a bank attitude responsive device 185 in accordance with the bank attitude of the craft. The bank attitude device may be a conventional vertical flight gyroscope so arranged as to stabilize the slider 181 relative to resistor 182 during banking of the craft. A conductor 186 connects a center tap of secondary winding 175 and slider 181. Network 188 comprises a trim potentiometer 189 having a slider 190 and a resistor 191 which resistor is connected across a secondary winding 192 of the transformer. Slider 190 is manually adjusted along resistor 191. A conductor 193 connects slider 190 with a center tap of secondary winding 183. Network 194 comprises a maneuvering potentiometer 195 having a slider 196 and resistor 197. The resistor 197 is connected across a secondary winding 198 of the transformer. Slider 196 is positioned along resistor 197 through a suitable operating connection 200 in accordance with the movement of a manually operable automatic pilot controller 240. A conductor 199 connects slider 196 with a center tap of secondary winding 192 and a conductor 201 extends from a center tap of secondary winding 198 to ground and thence through ground to the amplifier conductor 159. The distinction between the trim potentiometer 189 and the maneuvering potentiometer 195 is primarily in the magnitude of the available output voltage. Potentiometer 189 may be manually operated to electrically align the automatic pilot with the attitude of the aircraft prior to engaging the automatic pilot with the control surface of the craft. The potentiometer 195 is used for manual maneuvering purposes after the automatic pilot is engaged.

The engagement operation of the automatic pilot with the aileron control surfaces consists in electrically coupling the aileron servomotor amplifier 155 with the aileron servomotor 153 and mechanically coupling the aileron servomotor 153 with the cable drum 151. This engagement is effected upon the energization of the operating winding 204 of the engage relay 154.

One circuit for energizing operating winding 204 of the engage relay 154 comprises battery 205, conductor 206, single pole single throw manually operable switch 207, conductor 208, winding 204, conductor 209, servomotor operated pivoted switch arms 210, 211, conductor 212, roll rate gyroscope operated pivoted switch arm 213, double contact switch arm 214, roll rate gyroscope operated pivoted switch arm 215, conductor 216, conductor 217 to ground and return to battery ground conductor 226. When the winding is energized, conductor 187 completes a holding circuit for maintaining the winding energized when switch 207 opens. Alternative circuits for energizing winding 204 are also provided, one comprising energized conductor 209, normally closed servo operated switch arms 210, 211, conductor 218, switch arm 219, pilot controller operated double contact arm 220, conductor 221, double contact arm 214, single contact pivoted switch arm 215, conductor 216, conductor 217, to ground and return to battery ground 226. Another circuit comprises energized conductor 209, normally closed switch arms 210, 211, conductor 212, switch arm 213, double contact arm 214, conductor 221, pilot controller operated double contact switch arm 220, contact arm 222, conductor 223, conductor 217, to ground and return to battery ground 226.

Pivoted switch arms 210, 211 have their free ends engageable by an operating arm 224 carried on the operating connection 170 extending from the cable drum 151. One or the other of the pivoted arms 210, 211 is engaged by the arm 224 depending upon the extent and direction of rotation of the cable drum 151. The pivoted switch arms 213, 215 are operated by an arm 225 carried by the operating means 176 positioned by the roll rate gyroscope 177. The arm 225 disengages switch arm 213 or switch arm 215 from the double contact arm 214 depending upon the direction and magnitude of rate of roll. A fork like member 227 is carried on the operating means 200 of the maneuvering controller 240. The member 227, depending upon its direction of rotation, causes the double contact pivoted switch arm 220 to engage one or the other of the single contact switch arms 219, 222.

The roll rate gyroscope 177 is of the conventional type and comprises a rotor 228 rotatably carried about an axis 229 in a gimbal ring 230. The gimbal ring 230 in turn is rotatably carried about an axis 231 at right angles to axis 229 in pedestal bearings 232, 233 upstanding from a base 234. Axis 231 carries a depending arm 235 which at its lower end is engaged by centering spring means 236 supported from pedestal bearing 233. The arrangement is such that as the craft rolls about its pitch axis, the gyroscope rotor 228 precesses about axis 231 and this precession as conventional is restrained by the spring means 236. The extent of precession is dependent upon the rate of roll of the craft. Arm 225 is so related to switch arms 213, 215 that when a predetermined rate of roll is exceeded in either direction, one or the other of the pivoted switch arms will be disengaged from the double contact switch arm 214.

The maneuvering controller 240 comprises a control stick 241 journaled in a base 242 fixed to the craft for pivotal movement about axis 200. Movement of the stick 241 is transmitted to the slider 196 and also to the fork member 227. The actuation of the fork member 227 causes the pivoted double contact switch arm 220 to engage one or the other of the single contact arms 219, 222.

*Operation*

It is apparent that automatic control will be applied to the aileron control surfaces upon closing of the manually operable switch 207 if the servomotor actuated arm 224 is within its operating range and the gyroscope actuated arm 225 within its operating range relative to contact arms 213, 215.

If the rate of roll of the craft attains such magnitude that the actuating arm 225, with the control stick 241 in its unoperated position, engages either switch arms 213, 215 the circuit for energizing the engage relay winding 204 will be interrupted and the automatic pilot will be disengaged from the aileron control surfaces permitting their conventional direct manual operation.

If the maneuvering stick 241 be operated to initiate a control signal from potentiometer 195 and also through the fork member 227 causes the double contact arm 220 to engage switch arm 219 or 222 a selected rate of roll may be initiated from the potentiometer 195. If the rate of roll be such as to cause operating arm 225 to engage one or the other of contacts 213, 215 the energization of the relay winding 204 will nevertheless be maintained. This is evident since as indicated by the arrows in Figure 2, if the control stick 241 be operated in a direction to initiate a right roll of the craft, the double contact arm 220 engages contact arm 219. If the rate of roll to the right resulting thereby approaches such a magnitude that actuating arm 225 disengages arm 213 from double contact arm 214 the energization of operating winding 204 is maintained through the engagement of contacts 219, 220 and the continued engagement of contact arms 214, 215. Similarly if the control stick 241 were moved to initiate a roll to the left which attained a rate of roll that caused actuating arm 225 to disengage contact 215 from contact 214, the circuit for maintaining the energization of relay operating winding 204 would be maintained through the engagement of contacts 220, 222 and the continued engagement of contacts 213, 214.

If the servomotor cable drum 151 has rotated in either direction its maximum permissible amount the actuating arm 224 will disengage switch arms 210, 211 to interrupt the circuit for energizing the relay winding 204 irrespective of the unoperation of switch arms 213, 215 or the operation of switch arm 220 into engagement with arm 219 or arm 222.

The arrangement in Figure 2 disengages the automatic pilot ordinarily when the rate of roll attains a predetermined amount. However, in order that manual maneuvers may be carried out which involve a higher rate of roll of the craft provisions are made for maintaining the automatic pilot engaged with the craft although the craft may exceed the normal roll rate permitted. The servomotor operated disengagement control is to limit the permissible displacement of the aileron surfaces to prevent abutment with the craft and consequent damage and is not concerned with the maneuvering of the craft which normally is accomplished within the servomotor operation limits.

Since many apparently widely different embodiments of the invention could be made without departing from the principles thereof, and since the axis controlled may be the vertical as well as the roll and pitch axes of the craft or all three axes it is desired that all matter contained in the above description or shown in the accompanying drawing shall be considered as illustrative and not a limitation thereon.

I claim as my invention:

1. A monitoring apparatus for a dirigible craft having a control surface for controlling the rate of turn of said craft, said apparatus comprising: a motor means adapted to operate said surface; a balanceable network; means for unbalancing said network; follow-up means driven by said motor means for rebalancing said network; means including a pair of relays alternatively operated depending on the direction of unbalance of said network; a craft rate of turn responsive device reversibly operated in accordance with the direction of craft turn; a pair of normally energized control relays; means for energizing said motor in one direction through an operated one of said pair of relays and one of said control relays to displace said control surface and thereby set up a rate of craft turn; craft angular rate responsive means for deenergizing said one of said control relays on said craft exceeding a predetermined rate of turn; and means for energizing said motor in the opposite direction while said one of the control relays is deenergized through the other of said pair of relays and the other of the pair of control relays.

2. A monitoring apparatus for a dirigible craft having a control surface for controlling the rate of turn of said craft about an axis thereof, said apparatus comprising: a motor means adapted to operate said surface; a balanceable network; means for unbalancing said network; follow-up means driven by said motor means for rebalancing said network; means including a first pair of relays alternatively operated depending on the direction of unbalance of said network, each relay including a normally engaged first arm and contact and a normally separated second arm and contact; a craft rate of turn responsive device reversibly operated in accordance with the direction of craft turn; a pair of normally energized control relays alternatively deenergized by said turn rate responsive device depending on the rate and direction of craft turn; an engage relay for operatively connecting said motor means and said surface; means for energizing said motor means in one direction through one of said pair of control relays and said second arm and contact of one of said first pair of relays to displace said control surface and thereby set up a rate of craft turn; means for rendering said one of said control relays ineffective on said craft exceeding a predetermined rate of turn, thereby preventing further forward displacement of said control surface but permitting reverse operation thereof; and means operated by said turn responsive device on said craft attaining a still higher rate of turn for deenergizing said engage relay and thereby disconnecting said motor means from said control surface.

3. Apparatus for monitoring the rate of turn of a dirigible craft about an axis thereof; said craft having a control surface, comprising: a motor means adapted to operate said surface; automatic attitude apparatus responsive to the turn of said craft about said axis; a first pair of relays alternatively energized from the attitude apparatus depending upon the direction of craft rotation about said axis; a second pair of control relays normally effective; means responsive to the craft rate of turn for rendering one or the other of said second pair of relays ineffective at a predetermined rate of turn depending upon the direction and rate of turn; means for energizing said motor means in one direction including one of said first pair of relays and one of said control relays to displace said control surface and thereby set up a movement of said craft to return said craft to its original attitude; whereby when said rate of turn to restore said attitude exceeds a predetermined value said one of said control relays is rendered ineffective to prevent further displacement of said surface; and means for energizing the motor in the opposite direction while one control relay is ineffective including the other of said first pair of relays and the other control relay.

4. A monitoring apparatus for an aircraft having a control surface for controlling the rate of turn of said craft about an axis thereof, said apparatus comprising: a motor means adapted to operate said surface; a balanceable network; means for unbalancing said network; follow-up means driven by said motor means for rebalancing said network; means connected to said network and reversibly controlling the direction and extent of the operation of said motor means in accordance with the direction and extent of unbalance of said network; a rate of turn gyroscope responsive to the angular rate of movement of said craft about said axis; and means controlled by said rate of turn gyroscope to prevent further energization of said motor means from said potential responsive means when said rate of turn of said craft about said axis has reached a predetermined value.

5. A monitoring apparatus for an aircraft having a control surface for controlling the rate of turn of said craft about an axis thereof, said apparatus comprising: a motor means adapted to operate said surface; a balanceable network; means responsive to change in attitude of said craft about said axis for unbalancing said network; follow-up means driven by said motor means for rebalancing said network; signal responsive means operated by said network; connecting means including said signal responsive means for energizing said motor means; a device responsive to the angular rate of movement of said craft about said axis; and means in said connecting means operated by said device upon the attainment of a predetermined angular rate for separating said motor means from said source of power.

6. A monitoring apparatus for an aircraft having a control surface for controlling the angular movement of said craft about an axis thereof, said apparatus comprising: a motor means adapted to operate said surface; a balanceable network; means for unbalancing said network in either of two directions to alter the phase of the output of said network; follow-up means driven by said motor means for rebalancing said network; a voltage responsive means controlled by said network; connecting means including said voltage responsive means for associating said motor means with a source of power; a device responsive to the angular movement of said craft about said axis; and further means in said connecting means operated by said device for disassociating said motor means from said source of power until the opposite unbalance of said network occurs.

7. A monitoring apparatus for an aircraft having a control surface for controlling the angular rate of said craft about an axis thereof, said apparatus comprising: a motor means; means for operatively engaging said motor means with said control surface; a balanceable network; means for unbalancing said network; follow-up means driven by said motor means for rebalancing said network; voltage responsive means connected to said network for operation thereby; connecting means including said voltage responsive means for associating said motor means with a source of power; a device responsive to the angular rate of said craft about an axis due to a displaced surface;

further means in said connecting means and operated by said device for disassociating said motor means from said power source at a predetermined angular rate; and additional means operated by said device on said angular rate exceeding said predetermined angular rate for disengaging said motor means from said control surface.

8. Monitoring apparatus for an aircraft movable about an axis thereof and having a control surface displaceable from a normal position in either direction for moving said craft in either direction about said axis, said apparatus comprising: attitude means for producing a signal in accordance with the extent of rotation of said craft about said axis; a device responsive to the angular rate of movement of said craft about said axis resulting from displacement of said surface from normal position; connecting means for associating said control surface operating means with a source of power; and means in said connecting means operated by said attitude means for associating said operating means with said power means and further means in said connecting means responsive to said device for disassociating said operating means from said source of power.

9. A monitoring apparatus for an aircraft rotatable about an axis thereof and having a control surface for controlling the angular rate of said craft about said axis, said apparatus comprising: attitude means including a balanceable network unbalanced thereby for detecting movements of said craft about said axis; a servomotor adapted to position said surface to restore said attitude; a rate of turn device responsive to the angular rate of said craft about said axis; manually operable means for unbalancing said network; and further means for comparing the direction of unbalance of said network due to operation of said manual means and the direction of operation of said rate of turn device and effective to connect or disconnect said servomotor with a source of power in accordance with the comparison of said directions.

10. Control apparatus for a dirigible craft rotatable about an axis thereof and having a control surface for controlling the angular rate of movement of said craft about said axis, said apparatus comprising: position change detecting means for detecting the movement of said craft about said axis from a predetermined position; rate sensitive means responsive to the rate of movement of said craft about said axis; operating means for said surface; operable connecting means for associating said operating means with a source of power including means for comparing the operation of said rate sensitive means and said position change detecting means.

11. Control apparatus for controlling a condition comprising: a servomotor adapted to be operatively engaged with a condition controlling device; a condition sensing device responsive to change in said condition; means for reversibly operating said servomotor to change said condition, including reversibly movable servomotor operation initiating means responsive to said condition sensing device and servomotor operation limit control means; and means for adjusting said servomotor operation limit control means from said sensing device on a predetermined change in said condition for terminating forward operation of said servomotor which forward operation is as determined by the movement of said operation initiating means.

12. The apparatus of claim 11, and additional means effective on reverse movement of said operation initiating means to reversely operate said servomotor.

13. A monitoring apparatus for an aircraft having a control surface for controlling a flight condition of said craft, said apparatus comprising: a motor means adapted to operate said surface; a balanceable network; means for unbalancing said network; follow-up means driven by said motor means for rebalancing said network; potential responsive means connected to said network and reversibly controlling said motor means in accordance with the direction of unbalance of said network; a device responsive to change in condition of said craft; and additional means controlled by said device to prevent further energization of said motor means from said potential responsive means when a predetermined flight condition of said craft has been reached.

14. A monitoring apparatus for an aircraft having a control surface for controlling the rate of turn of said aircraft about an axis thereof, said apparatus comprising: a motor means adapted to operate said surface; a balanceable network; attitude means for unbalancing said network; follow-up means driven by said motor means for rebalancing said network; means connected to said network and reversibly controlling said motor means in accordance with the direction of unbalance of said network; a rate of turn gyroscope responsive to the movement of said craft about said axis; additional means controlled by said rate of turn gyroscope to prevent further energization of said motor means from said potential responsive means when said rate of turn of said craft about said axis has reached a predetermined value; manually operable means for unbalancing said network to effect operation of said control surface and thus rotation of said craft about said axis; and further means associated with said additional means and operated by said manual means to maintain energization of said motor means irrespective of the response of said rate of turn gyroscope.

15. A monitoring apparatus for an aircraft having a control surface for controlling the rate of turn of said craft about an axis thereof, said apparatus comprising: a motor means adapted to operate said surface; a balanceable network; means responsive to change in attitude of said craft about said axis for unbalancing said network; follow-up means driven by said motor means for rebalancing said network; signal responsive means operated by said network; connecting means including said signal responsive means for connecting said motor means to a source of power; a device responsive to the angular rate of movement of said craft about said axis; means in said connecting means operated by said device upon the attainment of a predetermined angular rate for separating said motor means from said source of power; manually operable means for unbalancing said network to initiate turning of a craft about said axis; and further means operated by said manual means and associated with said connecting means to maintain the connection of said motor means with said source of power irrespective of the response of said angular rate device.

16. A monitoring apparatus for an aircraft having a control surface for controlling the rate of turn of said craft about an axis thereof, said apparatus comprising: a motor means adapted to operate said surface; signal responsive means; connecting means including said signal responsive means for energizing said motor means from a source of power; means responsive to change in attitude of said craft about said axis for operating said signal responsive means; a device responsive to the angular rate of movement of said craft about said axis; means in said connecting means operated by said device upon the attainment of a predetermined angular rate for separating said motor means from said source of power; manually operated means for operating said signal responsive means to effect movement of said aircraft about said axis; and further means operated by said manual means and associated with said connecting means for maintaining the energization of said motor means irrespective of the response of said angular rate device.

17. Condition controller apparatus having a condition regulating device, said apparatus comprising: motor means for operating said device; means responsive to the rate of change of said condition; operable means for connecting said motor means to a source of power; means for controlling said operable means from said condition rate change means; additional means controlled by said condition rate change means on attainment of a predetermined rate for rendering inoperative said operable means; manually actuable means for controlling said operable means; and further means controlled by said manually actuable means for maintaining said operable means operable irrespective of the response of said rate of condition change means.

18. Control apparatus for controlling a condition comprising: a servomotor adapted to be operatively engaged with a condition controlling device; a condition sensing device responsive to change in said condition; means for reversibly operating said servomotor to change said condition, including reversibly movable servomotor operation initiating means and servomotor control means; means for adjusting said servomotor control means from said sensing device on a predetermined change in said condition for terminating forward operation of said servomotor which forward operation is as determined by the movement of said operation initiating means, and further means operated by said sensing device for effecting operative disengagement of said servomotor and condition controlling device when a maximum change in said condition is attained.

19. A monitoring apparatus for an aircraft having a control surface for controlling a flight condition of said craft, said apparatus comprising: a motor means adapted to operate said surface; a balanceable network; means for unbalancing said network; follow-up means driven by said motor means for rebalancing said network; potential responsive means connected to said network and reversibly controlling said motor means in accordance with the direction of unbalance of said network; a device responsive to change in condition of said craft; additional means controlled by said device to prevent further energization of said motor means from said potential responsive means when a predetermined flight condition of said craft has been reached; manually operable means for unbalancing said network to effect operation of said motor means; and further means associated with said additional means and operated by said manual means to maintain energization of said motor means irrespective of the response of said device.

20. Control apparatus for an aircraft for controlling a flight condition comprising: a servomotor adapted to be operatively engaged with a flight condition controlling device; a flight condition sensing device responsive to change in said flight condition; means for reversibly operating said servomotor to change said flight condition, including reversibly adjustable servomotor operation initiating means and servomotor control means; additional means for adjusting said servomotor control means from said sensing device on a predetermined change in said flight condition for terminating forward operation of said servomotor which forward operation is as determined by the adjustment of said servomotor operation initiating means; manually operable means for controlling said reversibly adjustable servomotor operation initiating means; and further means associated with said additional means for adjusting said servomotor control means and operated by said manual means to maintain operation of said servomotor irrespective of the response of said flight condition sensing device.

21. A monitoring apparatus for an aircraft in flight having a control surface for controlling a flight condition of said craft, said apparatus comprising: a motor means adapted to operate said surface; a balanceable network; means for unbalancing said network; follow-up means driven by said motor means for rebalancing said network; potential responsive means connected to said network and reversibly controlling said motor means in accordance with the direction of unbalance of said network; a device having an element which is moved upon a change in the flight condition of said craft; additional means controlled by said movable element to prevent further energization of said motor means from said potential responsive means when said element reaches a predetermined position; manually operable means for unbalancing said network to effect operation of said motor means and surface; and auxiliary means associated with said additional means and operated by said manual means to maintain energization of said motor means irrespective of the position of said movable element.

References Cited in the file of this patent

UNITED STATES PATENTS

| 2,403,658 | Hayman | July 9, 1946 |
| 2,480,574 | Hanna et al. | Aug. 30, 1949 |
| 2,487,793 | Esval et al. | Nov. 15, 1949 |
| 2,589,834 | MacCallum | Mar. 18, 1952 |
| 2,595,250 | Harcum | May 6, 1952 |
| 2,604,613 | Klass | July 22, 1952 |
| 2,674,711 | MacCallum | Apr. 6, 1954 |

FOREIGN PATENTS

| 624,201 | Great Britain | May 30, 1949 |